(12) United States Patent
Niederman et al.

(10) Patent No.: US 6,203,061 B1
(45) Date of Patent: Mar. 20, 2001

(54) VARIABLE OUTPUT AIR BAG MODULE WITH PAV HEAT SINK

(75) Inventors: Robert Raymond Niederman, Dayton; Allen Richard Starner, Springboro; Shawn Gregory Ryan, Dayton; Graham Thornton Spencer, Troy; John Paul Sparkman, Dayton, all of OH (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 09/414,430

(22) Filed: Oct. 7, 1999

(51) Int. Cl.[7] .................................................. B60R 21/26
(52) U.S. Cl. ........................................... 280/736; 280/742
(58) Field of Search .................................... 280/735, 736, 280/741, 742, 737

(56) References Cited

U.S. PATENT DOCUMENTS

| | | | |
|---|---|---|---|
| 3,972,545 | * 8/1976 | Kirchoff et al. | 280/735 |
| 5,366,242 | 11/1994 | Faigle et al. . | |
| 5,413,378 | 5/1995 | Steffens, Jr. et al. . | |
| 5,513,879 | * 5/1996 | Patel et al. | 280/739 |
| 5,530,226 | 6/1996 | Gentry et al. . | |
| 5,603,525 | * 2/1997 | Zakula | 280/737 |
| 5,707,078 | 1/1998 | Swanberg et al. . | |
| 5,803,494 | * 9/1998 | Headley | 280/741 |
| 5,927,753 | * 7/1999 | Faigle et al. | 280/735 |
| 5,934,705 | * 8/1999 | Siddiqui et al. | 280/736 |

* cited by examiner

Primary Examiner—Paul N. Dickson
(74) Attorney, Agent, or Firm—Kathryn A. Marra

(57) ABSTRACT

The present invention provides variable deployment performance by controlling the heat content of the inflator gas which exits an air bag sub-module, disposed in a module, into an air bag cushion. The air bag sub-module includes a sub-module housing which receives an inflator in a central cavity formed therein. The module housing includes low output module ports formed in the module housing and high output module ports. Heat sinking material is disposed within the sub-module housing between an outer wall of the sub-module housing and the inflator such that the heat sinking material surrounds the low output module ports. The air bag sub-module provides a first fluid flow path for the heated inflator gas to flow under high level deployment conditions and a second fluid flow path for the inflator gas to flow under reduced level deployment conditions. The first fluid flow path comprises a low resistance fluid flow path in which the heated inflator gas exits the inflator through the high output module ports. Little or no heated inflator gas will flow through the second fluid flow path, which comprises a high resistance fluid flow path, because in order for the inflator gas to flow according to the second fluid flow path, the inflator gas must pass through the high resistance heat sink material and the low output module ports. The heat content of the inflator gas is reduced by forcing the inflator gas to flow according to the second fluid flow path.

17 Claims, 1 Drawing Sheet

VARIABLE OUTPUT AIR BAG MODULE WITH PAV HEAT SINK

TECHNICAL FIELD

The present invention relates generally to vehicle supplemental inflatable restraint systems and, more particularly, to an air bag module that provides variable output inflation of an air bag cushion from a single inflator.

BACKGROUND OF THE INVENTION

Driver side or passenger side supplemental inflatable restraint (SIR) systems typically include an air bag stored in a housing module within the interior of the vehicle in close proximity to either the driver or one or more passengers. SIR systems are designed to actuate upon sudden deceleration so as to rapidly deploy an air bag to restrain the movement of the driver or passengers. During deployment, gas is emitted rapidly from an inflator into the air bag to expand it to a fully inflated state.

Air bag passive restraint systems include an inflator, which produces gas to inflate the air bag cushion. Known inflators for air bag modules are generally of three types. One type is the pure gas inflator wherein a pressure vessel contains stored pressurized gas. The pressure vessel communicates with the cushion through various types of rupturable outlets or diaphragms. Another type is the gas generator wherein a propellant is ignited and the resultant gas flow through an outlet to the cushion. A third type is the hybrid or augmented type. This type includes a pressure vessel containing stored pressurized gas and a gas generator. When the generator is ignited, the resultant gas flows with the stored gas to the cushion through the pressure vessel outlet.

It is also known to inflate the cushion at a relatively low rate under low level deployment conditions, such as a sudden low level deceleration, and at a relatively high rate under high level deployment conditions, such as a sudden high level deceleration. This can be accomplished in a pure gas type inflator by providing the pressure vessel with an outlet of variable flow area. In addition, devices are known which provide primary inflation (reduced inflation) and full level inflation using a single gas vessel with two separate gas heaters. Primary inflation is accomplished by actuating the gas vessel and heating the gas at a specified reduced level. Full level inflation is accomplished by actuating a second separate heater located at the bottom of the gas vessel to heat the gas at a greater level. This second heater is deployed at the same time or a delayed time as the primary heater to provide full level inflation. It is also known in the art to use a system having two discrete inflators to accomplish dual level inflation. In these types of systems, two discrete inflators are deployed at the same time or at a delayed time depending upon the severity of the sudden deceleration.

It is desirable to provide an air bag module which utilizes utilizes a single stage inflator and a simple air bag cushion and which is capable of variable air bag cushion inflation.

SUMMARY OF THE INVENTION

This invention offers advantages and alternatives over the prior art by providing an air bag sub-module which offers variable deployment performance by controlling the heat content of the inflator gas which exits the air bag sub-module into the air bag cushion. The air bag sub-module includes a sub-module housing which receives an inflator in a central cavity formed therein. The inflator is provided for generating inflator gas for inflation of an air bag cushion and the inflator has inflator discharge ports to permit the generated inflator gas to flow from the inflator with the sub-module housing. The inflator includes a first initiator which upon actuation ignites pyrotechnic material to generate the inflator gas. The air bag sub-module includes low output module ports formed in the sub-module housing and high output module ports also formed therein at one end. Heat sinking material is disposed within the sub-module housing between an outer wall of the sub-module housing and the inflator such that the heat sinking material surrounds the low output module ports.

A slide or stopper mechanism is provided at an end of the sub-module housing opposite the first initiator, wherein the mechanism include a second initiator and a projectile which is driven by pressure generated by the second initiator upon actuation thereof. The sub-module housing includes an inner wall which partitions the internal cavity of the sub-module housing so that the inflator is on one side of the inner wall and the high output module ports are on the opposite side of the inner wall. In the illustrated embodiment, the inner wall comprises an annular wall. The inner wall includes an opening which is sized to receive the projectile in a gas tight manner when the second initiator is actuated to drive the projectile toward the inflator.

According to the present invention, the air bag sub-module provides a first fluid flow path for the heated inflator gas to flow under first deployment conditions (high level deployment conditions) and a second fluid flow path for the inflator gas to flow under second deployment conditions (reduced level deployment conditions). The first fluid flow path comprises a low resistance fluid flow path in which the heated inflator gas exits the inflator through the inflator ports and travels within the sub-module housing to the high output module ports and into the air bag cushion. Under these first deployment conditions, the second initiator is not actuated and therefore the projectile remains in the retracted position and the inflator gas is permitted to flow between the inflator and the high output module ports. Little or no heated inflator gas will flow through the second fluid flow path, which comprises a high resistance fluid flow path, because in order for the inflator gas to flow according to the second fluid flow path, the inflator gas must pass through the high resistance heat sink material and the low output module ports. Accordingly, the heat content of the inflator gas is not significantly reduced when the inflator gas flows according to the first fluid flow path and the air bag cushion is inflated at a high level of deployment.

Under the second deployment conditions, the second initiator is actuated and the projectile is driven forward toward the inflator and blocks the first fluid flow path. More specifically, the projectile lodges within the opening formed in the inner wall of the sub-module housing and thereby blocks gas from traveling from the inflator ports to the high output module ports. This blockage forces the heated inflator gas to fluidly communicate with the heat sink material and then out through the low output module ports to inflate the air bag cushion. The heat sink material dissipates heat from the heated inflator gas and thus reduces the heat content of the inflator gas. Consequently, the inflator gas has a reduced volume as a result of the reduced heat content of the inflator gas. This results in the air bag cushion being inflated at a reduced level of deployment.

Accordingly, the air bag sub-module of the present invention offers variable output inflation by controlling the heat content of the inflator gas entering the air bag cushion, and therefore the performance characteristics of the air bag sub-module are variable.

The above-described and other features and advantages of the present invention will be appreciated and understood by those skilled in the art from the following detailed description, drawings, and appended claims.

BRIEF DESCRIPTION OF THE DRAWINGS

The present invention will now be described, by way of example only, with reference to the accompanying drawing in which.

DETAILED DESCRIPTION OF THE INVENTION

Figure 1:
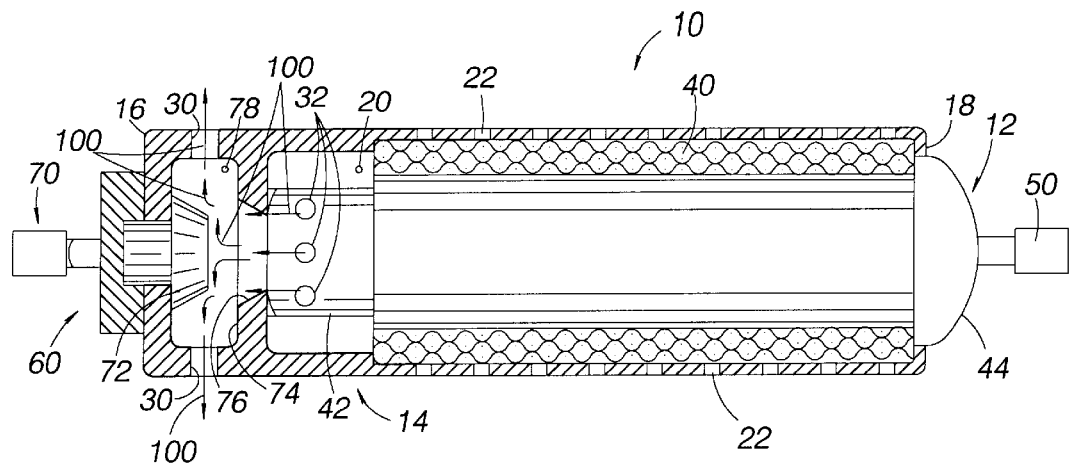
FIG. 1 is a sectional side view of an air bag sub-module embodying the present invention with the sub-module being in a high level deployment state.
Figure 2:
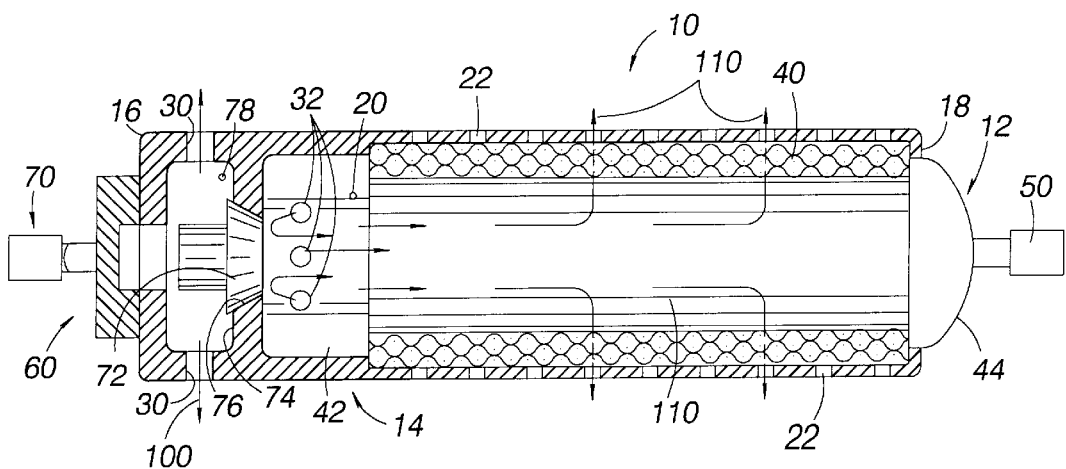
FIG. 2 is a sectional side view of an air bag sub-module embodying the present invention with the sub-module being in a low level deployment.

Referring to the FIGS. 1 and 2, an air bag sub-module according to the present invention is generally designated at 10. The air bag sub-module 10 is suitably mounted to an instrument panel or the like or may be disposed in a door assembly (not shown). The air bag sub-module 10 is intended to be disposed in an air bag module along with an air bag cushion and other equipment (not shown). The air bag sub-module 10 includes an inflator 12 for generating inflator gas upon the sensing of predetermined vehicle conditions, i.e. rapid deceleration, to inflate the air bag cushion. The air bag sub-module 10 includes a sub-module housing 14 which partially defines multiple fluid flow paths provided by the air bag sub-module 10 of the present invention. The sub-module housing 14 has a first end 16 and an opposing second end 18 and includes a central cavity 20 for receiving the inflator 12. Preferably, the inflator 12 and the sub-module housing 14 are complementarily sized so that the inflator 12 easily slides therein and is properly located and secured within the sub-module housing 14. In the exemplary embodiment, the sub-module housing 14 has a cylindrical shape and includes a plurality of low output module ports 22 formed therein. The low output module ports 22 are preferably disposed circumferentially about the sub-module housing 14 and extend from the second end 18 to a predetermined location intermediate the first and second ends 16 and 18. In the illustrated embodiment, the low output module ports 22 have a generally circular shape; however, ports 22 may be in the form of any number of shapes. The sub-module housing 14 further includes high output module ports 30 which are proximate the first end 16 thereof. In the exemplary illustrated embodiment, the high output module ports 30 are disposed circumferentially about the sub-module housing 14 proximate the first end 16.

The inflator 12 may be of any conventional construction for generating inflator gas to inflate the air bag cushion. Advantageously, the inflator 12 is preferably a single stage inflator which outputs inflator gas to inflate the air bag cushion. The inflator 12 is received within the sub-module housing 14 and includes a plurality of inflator ports 32. A first initiator 50 is connected to the inflator 12 and serves to ignite the pyrotechnic material. The first initiator 50 also includes a portion which acts as an electrical connector so that an electrical signal may be sent to the first initiator 50 for actuation thereof. Preferably, the first initiator 50 comprises a first pyrotechnic device 50; however, it will be appreciated that other initiator devices may be used with the present invention. The ignition of the pyrotechnic material generates heated gas that is discharged through the plurality of inflator ports 32 and exits the air bag module 10 to inflate the air bag cushion.

According to the present invention, the inflator 12 is surrounded by sub-module heat sinking material 40 which is assembled within the sub-module housing 14. Heat sinking material 40 comprises suitable heat sinking materials known and use in the art and in an exemplary embodiment, the heat sinking material 40 comprises stainless steel or carbon steel wrapped filters. These filters may be with or without ceramic layers. It is also within the scope of the present invention that additional wraps of filtering materials may be used, wherein these filtering materials have higher coefficients of heat transfer, such as copper, so long as these materials are used in the boundaries where the heat generated would not erode the metal materials. As shown in FIG. 1, a first end portion 42 of the inflator 12 is not surrounded by the heat sinking material 40 and is located proximate the high output module ports 30. A second end portion 44 of the inflator 12 is disposed within the sub-module housing 14. The first pyrotechnic initiator 50 is connected to the second end portion 44 of the inflator 12.

A slide or stopper mechanism 60 is provided at first end 16 of the sub-module housing 14 and is secured within an opening formed in module housing 14. Slide mechanism 60 includes a second initiator 70 having a projectile 72 which acts to prevent fluid communication between the high output module ports 30 and the inflator 12 when the second pyrotechnic initiator 70 is actuated. The second initiator 70 preferably comprises a second pyrotechnic device 70; however, the second initiator may comprise other suitable devices such as a solenoid device or a mechanical device which acts to drive projectile 72. The second initiator 70 also includes an electrical connector portion which is designed so that a second electrical signal is delivered from the controller to the second initiator 70 to actuate the second initiator 70. The projectile 72 may take a number of shapes and in an exemplary embodiment, the projectile 72 comprises a slide member or a stopper member. The projectile 72 may be manufactured of any current materials (such as stainless steel, carbon steel, aluminum or plastics) which are capable of staying intact during all environmental conditions when subjected to the inflator gas from the inflator 12. More specifically, the sub-module housing 14 includes an annular wall 74 which partitions the first end 16 of the module housing 14 from the inflator 12. The annular wall 74 includes an opening 76 which provides selective fluid communication between the inflator 12 and the high output module ports 30. In other words, a second cavity 78 is formed by annular wall 74 and the high output module ports 30 are disposed within the second cavity 78. As best shown in FIG. 2, the projectile 72 has a complementary shape as the annular wall 74 so that the actuation of second pyrotechnic initiator 70 causes the projectile 72 to be projected toward the annular wall 74 resulting in the projectile 72 becoming lodged within the opening 76, thereby preventing the fluid from flowing from the inflator 12 to the high output module ports 30.

As is known, inflator 12 is actuated in response to sudden deceleration of the vehicle whereupon heated gas discharges from the inflator 12 through inflator ports 32 disposed in the inflator 12 to inflate the air bag cushion. The inflator 12 releases a predetermined volume of heated gas in response to the sensed deceleration of the vehicle. The output inflation of the inflator 12 is sufficient to deploy the air bog cushion at a full (high) level or reduced deployment level. A controller (not shown), e.g., sensing and actuating system, generates an ignition signal to the inflator 12 in response to velocity responsive sensors (not shown) mounted on the vehicle bumper and/or acceleration, or inertia responsive sensors mounted on a part of the vehicle occupant compartment, such as the fire wall. In response to the sensed signals, the controller provides an ignition signal to the inflator 12 to initiate deployment inflation of the air bag cushion in accordance with a predetermined level of deceleration. In response to the ignition signal, the inflator 12 releases an appropriate predetermined volume of gas into the air bag cushion through the ports 32 of the inflator 12 and through respective ports formed within the sub-module housing 14. The level of deployment of the air bag cushion is dependent upon the precise fluid flow path by which the heated inflator gas flows as it exits the air bag module 10 to inflate the air bag cushion.

According to the present invention, a first fluid flow path, generally indicated at 100, is provided (FIG. 1). The first fluid flow path 100 is defined by the inflator ports 32 and the high output module ports 30 such that the heated inflator gas generated by the inflator 12 exits therefrom through the inflator ports 32 and flows within the module housing 14 towards the high output module ports 30. Because the heat sink material 40 does not surround the high output module ports 30, the inflator gas freely flows in an unrestricted manner through the high output module ports 30 to inflate the air bag cushion under first deployment conditions. The first deployment conditions are typically high level deployment conditions where it is desired to direct the inflator gas to the air bag cushion so that the cushion fully inflates.

According to the present invention, a second fluid flow path is provided and is generally indicated at 110 (FIG. 2). Second fluid flow path 110 is defined by the inflator ports 32 and the low output module ports 22, wherein the inflator gas flows through from the inflator 12 to the low output module ports 22. The inflator gas is forced to flow through the high resistance heat sink material 40 and exits the air bag module 10 through the low output module ports 22. Heat sink material 40 acts to dissipate heat from the inflator gas and therefore the level of deployment of the air bag cushion is likewise reduced. The inflator gas flows according to the second fluid flow path 110 under low level deployment conditions as will be described in greater detail hereinafter.

In operation of the air bag module 10, the default or initial position of the slide mechanism 60 may be disposed in the retracted position as shown in FIG. 1 wherein the high output module ports 30 are open and the inflator gas fluidly communicates between the inflator 12 and the high output module ports 30. Upon actuation of the air bag module 10 under high level deployment conditions as shown in FIG. 1, the controller actuates the first pyrotechnic initiator 70 of the inflator 12 to ignite the pyrotechnic material to generate heated inflator gas that discharges from inflator ports 32 of the inflator 12. Because the inflator gas has a lower resistance path to the high output module ports 30 due to the lack of heat sinking material 40 around the high output module ports 30, the inflator gas flows according to the first fluid flow path 100 and little or no inflator gas flows according to the second fluid flow path 110 through the heat sink material 40 and low output module ports 22 and into the air bag cushion. Consequently, high level deployment of the air bag cushion is achieved because the primary fluid flow path for the inflator gas to flow is the first fluid flow path 100 which does not communicate with the heat sinking material.

In the exemplary embodiment, under low level deployment conditions, both the first and second pyrotechnic actuators 50 and 70 are activated electrically. The activation of the second pyrotechnic actuator 70 causes the slide mechanism 60 to be moved by the pressure generated by the second pyrotechnic actuator 70. The second pyrotechnic actuator 70 when deployed generates heat and pressure which moves the projectile 72 forward into the opening 76 so that the projectile 72 seats with the opening 76 in a gas tight manner. Consequently, the inflator gas is blocked from flowing according to the first fluid flow path 100. In other words, the projectile 72 acts to block the gas path from the inflator ports 32 to the high output module ports 30. This blockage forces the heated inflator gas to flow through the heat sink material 40 and then out through the low output module ports 22. Because the heat sinking material 40 acts to dissipate heat from the inflator gas, the volume of the inflator gas is reduced. This results in a reduced level of deployment of the air bag cushion. This type of mechanism, including the second pyrotechnic initiator 70 which creates the gas pressure to drive the projectile 72 forward to block the second fluid flow path 110, may be thought of as a pyrotechnically actuated vent (commonly abbreviated as PAV).

The exemplary embodiment illustrated in FIG. 1 shows the slide mechanism 60 and more specifically, the projectile 72 disposed within the interior of sub-module housing 14. However, it will be appreciated that projectile 72 may alternatively be positioned directly in front of high output module ports 30. In this alternative embodiment, the actuation of second initiator 70 causes the projectile 72 to seat against sub-module housing 14 and close the high output module ports 30 so that the inflator gas is directed entirely through the low output module ports 22 into the air bag cushion. Furthermore, the projectile 72 also need not be considered to only actuate in the x-axis toward the opening 76 formed within annular wall 74. For example, the projectile 72 may be actuated by moving the projectile 72 (i.e. slide) circumferentially so as to block the high output module ports 30.

FIG. 2 is self-explanatory and illustrates air bag module 10 under low level deployment conditions when second initiator 70 has been actuated to cause projectile 72 to seat within opening 76, thereby preventing the inflator gas from flowing from inflator 12 to the high output module ports 30.

Broadly, the present invention discloses an air bag sub-module 10 having a low resistance gas path (second fluid flow path 110) which is selectively closed to force the heated inflator gas through a high resistance heat sink material 40 and subsequently through low output module ports 22 and into the air bag cushion under low level deployment conditions.

It will be understood that a person skilled in the art may make modifications to the preferred embodiment shown herein within the scope and intent of the claims. While the present invention has been described as carried out in a specific embodiment thereof, it is not intended to be limited thereby but is intended to cover the invention broadly within the scope and spirit of the claims.

What is claimed is:

1. An air bag sub-module for restraint of an occupant in a vehicle, the air bag sub-module comprising:

an inflator being activatable to discharge inflator gas for inflating an air bag cushion, the inflator having a plurality of discharge ports through which the inflator gas is discharged;

a sub-module housing including low output module ports and high output module ports in fluid communication with the air bag cushion, the inflator being securely received within the sub-module housing;

a heat sink material disposed within the sub-module housing intermediate an outer wall of the sub-module housing and the inflator, wherein the low output module ports fluidly communicate with the heat sink material; and an actuator assembly including a movable member for selectively controlling the heat content of the inflator gas discharged into the air bag cushion by restricting the fluid flow through the high output module ports under predetermined deployment conditions, and an actuator for moving the movable member.

2. The air bag sub-module as set forth in claim 1, wherein the actuator is pyrotechnic device.

3. The air bag sub-module as set forth in claim 1, wherein the sub-module housing includes an inner wall which serves to partition the inside of the sub-module housing such that the high output module ports are on one side of the inner wall and the inflator ports and low output module ports are on an opposite side of the inner wall.

4. The air bag sub-module as set forth in claim 3, wherein the inner wall includes an opening to permit inflator gas to flow from the inflator to the high output module ports, the opening having a complementary shape as the movable member so that upon activation of the actuator, the movable member closes the opening and prevents fluid communication between the inflator and the high output module ports.

5. The air bag sub-module as set forth in claim 1, wherein the actuator is capable of generating pressure for moving the movable member.

6. The air bag sub-module as set forth in claim 1, wherein the actuator is activated in response to a predetermined condition of the vehicle.

7. The air bag sub-module as set forth in claim 1, wherein the movable member comprises a projectile in the form of a slide or a stopper.

8. The air bag sub-module as set forth in claim 1, wherein the heat sink material comprises stainless steel or carbon steel wrapped fibers.

9. The air bag sub-module as set forth in claim 1, wherein in a first position the movable member is positioned such that inflator gas is permitted to flow from the inflator to the high output module ports and in a second position, the movable member prevents the fluid flow from the inflator to the high output module ports.

10. The air bag sub-module as set forth in claim 1, wherein under first development conditions, the inflator gas flows according to a first fluid flow path in which the inflator gas substantially flows from the inflator ports to the high output module ports for high level deployment of the air bag cushion.

11. The air bag sub-module as set forth in claim 1, wherein under second deployment conditions, the inflator gas flows according to a second fluid flow path in which the inflator gas flows from the inflator ports through the heat sink material to the low output module ports for low level deployment of the air bag cushion.

12. The air bag sub-module as set forth in claim 10, wherein the first deployment conditions comprise high level deployment conditions and the heat content of the inflator gas is at a first level.

13. The air bag sub-module as set forth in claim 12, wherein the second deployment conditions comprise low level deployment conditions and the heat content of the inflator gas is at a reduced second level, the second level being less than the first level, wherein the reduction in the heat content results from heat being dissipated by the heat sink material as the inflator gas flows therethrough.

14. The air bag sub-module as set forth in claim 1, wherein under high level deployment conditions, the inflator gas flows according to a low resistance fluid flow path and under low level development condition, the inflator gas flows according to a high resistance fluid flow path, wherein the inflator gas flowing according to the high resistance fluid flow path has a lower heat content than inflator gas flowing according to the low resistance fluid flow path.

15. A method for variably inflating an air bag cushion using an air bag module including a sub-module housing having an air bag inflator disposed therein, the inflator having inflator ports, wherein the method comprises:

providing low output module ports in the sub-module housing, the low output module ports being in fluid communication with the air bag cushion and the inflator ports;

providing high output module ports in the sub-module housing, the high output module ports being in fluid communication with the air bag cushion and selective fluid communication with the inflator ports;

disposing a heat sink material within the sub-module housing intermediate an outer wall of the module housing and the inflator, the low output module ports being in fluid communication with the heat sink material;

initiating the inflator to heat inflator gas upon first and second level deployment conditions, wherein the inflator gas flows to the high output module ports under the first deployment condition; and selectively closing the high output module ports from the inflator ports to prevent the inflator gas from flowing from the inflator to the high output module port resulting in the inflator gas flowing to the low output module ports under the second deployment condition.

16. The method as set forth in claim 15, wherein selectively closing the high output module ports comprises:

activating an acutuator assembly causing a moveable member to be disposed within the sub-modular housing so that fluid flow to the high output module ports is prevented.

17. The method as set forth in claim 16, wherein the moveable member comprises a slide or stopper.

* * * * *